United States Patent [19]

Suto

[11] Patent Number: 4,732,484
[45] Date of Patent: Mar. 22, 1988

[54] APPARATUS FOR MEASURING THE DIMENSIONS OF A MINUTE OBJECT

[75] Inventor: Takeshi Suto, Funabashi, Japan

[73] Assignee: Nippon Kogaku K. K., Tokyo, Japan

[21] Appl. No.: 745,945

[22] Filed: Jun. 18, 1985

[30] Foreign Application Priority Data

Jun. 26, 1984 [JP] Japan ............................ 59-131498

[51] Int. Cl.⁴ .......................................... G01B 11/00
[52] U.S. Cl. .................................... 356/372; 356/384
[58] Field of Search ................................ 356/372, 384

[56] References Cited

U.S. PATENT DOCUMENTS 3,214,596 10/1965 Schwerdt, Jr. et al. ............ 356/445

FOREIGN PATENT DOCUMENTS 53-23172 7/1978 Japan .

Primary Examiner—R. A. Rosenberger
Assistant Examiner—Crystal D. Cooper
Attorney, Agent, or Firm—Shapiro and Shapiro

[57] ABSTRACT

An optical apparatus for precisely measuring the dimensions of an object comprises an objective lens for forming an enlarged image of the object, a screen member onto which the enlarged image by the objective lens is projected and which is movable in a direction parallel to one direction on the image plane of the enlarged image, the screen member including a slit formed perpendicularly to the one direction, and a reflecting surface which is provided in an area including the surroundings of the slit and onto which the enlarged image is projected, observation optical means for observing therethrough the enlarged image on the reflecting surface, the observation optical means having a relay lens, and a field lens provided in opposed relationship with the reflecting surface of the screen member, the imaging light beam of the object from the objective lens passing through the field lens onto the reflecting surface of the screen member, the imaging light beam of the object reflected by the reflecting surface of the screen member passing through the field lens into the relay lens, the field lens having an optic axis that is in a plane perpendicular to the reflecting surface of the screen member and parallel to the slit and that is inclined with respect to the normal to the reflecting surface.

4 Claims, 5 Drawing Figures

APPARATUS FOR MEASURING THE DIMENSIONS OF A MINUTE OBJECT

BACKGROUND OF THE INVENTION

1. Field of the Invention

This invention relates to an optical apparatus for measuring the dimensions of a minute object such as a minute pattern on the surface of a photomask for the manufacture of integrated circuits.

2. Description of the Prior Art

Measurement by visual observation using a microscope has heretofore been practised to measure the dimensions of a pattern or the like formed on a photomask for the manufacture of IC, but as the requirement for higher accuracy and higher reproducibility of measurement becomes more critical, such measurement is being replaced by photoelectric measurement or measurement by image processing using ITV.

As a kind of photoelectric measurement, there is a slit scan method, and it is disclosed in detail, for example, in Japanese Patent Publication No. 23172/1978 by the assignee of the present invention. According to this, an enlarged image of a minute object by an objective lens of high magnification is formed on a slidable mirror having a slit, and by moving this mirror relative to the image, an intensity distribution created by the contrast of the image of the light passed through the slit is found, and the dimensions of the minute object can be found from this light intensity distribution. In this apparatus, the reflected light from the slidable mirror is condensed by a relay lens and the object image is reimaged and observed through an eyepiece and therefore, the entire measurement field can be observed and the in-focus state and position of the image on the mirror can be observed.

In such a conventional apparatus, however, the object image is re-imaged by the reflected light from the slidable mirror and therefore, the light that can be condensed by the relay lens is insufficient and the observed image is liable to be small in field of view and dark.

SUMMARY OF THE INVENTION

It is an object of the present invention to eliminate the above-noted disadvantages and to provide an apparatus for measuring the dimensions of a minute object which apparatus enables the positional relation between the object and a slit opening to be observed clearly without reducing the measurement accuracy.

The apparatus according to the present invention has an objective lens for forming an enlarged image of an object; a screen member onto which the image of the object by said objective lens is projected and which is movable relative to the projected image and has its area including a slit formed perpendicularly to the direction of movement and the surroundings of said slit formed into a mirror surface; an observation optical system having a relay objective lens for observing therethrough the image of the object projected onto the mirror surface of said screen member; and a field lens provided in opposed relationship with said mirror surface and disposed astride an optical path leading from said objective lens to said screen member and an optical path leading from said screen member to said relay objective lens; said field lens being inclined so that the image of the slit projected onto the screen member by the reflected light on the surface of said field lens is shifted along the lengthwise direction of the slit, whereby the image of the slit does not overlap the slit.

DESCRIPTION OF THE PREFERRED EMBODIMENT

Figure 1:
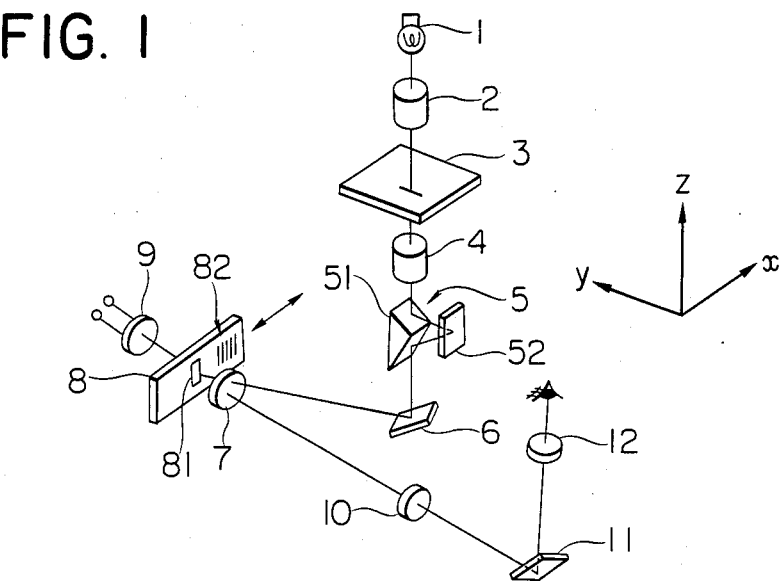
FIG. 1 is a perspective view schematically showing the construction of an embodiment of the present invention.

FIG. 1 schematically shows the construction of an embodiment of the present invention. The light beam from a light source 1 is condensed by a condenser lens 2 and illuminates an area of a sample 3 to be measured. The sample 3 is a transparent substrate having a minute pattern of contrast and is provided for movement in an x-y plane by a stage, not shown. The light beam passed through the sample 3 is imaged on a screen member 8 slidable in x direction, by an objective lens 4 and a field lens 7. An image rotating member 5 having a two-surface reflection prism 51 and a plane mirror 52 and a reflecting mirror 6 for bending the optical path are disposed between the objective lens 4 and the field lens 7. By the rotation of the image rotating member 5, the widthwise direction to be measured of the image formed on the surface of the screen member 8 parallel to an x-z plane is set so as to coincide with the direction of sliding of the screen member 8. A slit 81 elongated in z direction is formed on the screen member 8, and a measurement scale 82 is provided on one end of the screen member along the direction of sliding, and the amount of movement of the screen member 8 is detected by photoelectrically reading the measurement scale by a detector, not shown. Accordingly, the image formed on the surface of the screen member 8 is scanned by the slit 81 by the movement of the screen member. A photoelectric conversion element 9 responsive to the light beam passed through the slit 81 is disposed rearwardly of the slit 81, and the dimensions of the minute pattern on the sample 3 are measured by the state of the output from the photoelectric conversion element 9 relative to the amount of movement of the screen member measured by the detector. The surface of the screen member 8 which is opposed to the field lens 7 has a partial area thereof including the surroundings of the slit formed into a mirror surface, and the reflected light from this area is re-imaged on the focal plane of an eyepiece 12 by the field lens 7 and a relay objective lens 10 via a reflecting mirror 11, and the positional relation between the image on the screen member and the slit and the coincident state of the focus can be observed through the eyepiece 12.

The field lens 7 is provided to increase the brightness of the image in the observation field. As will be seen from the foregoing description, both of the optical path from the reflecting mirror 6 to the screen member 8 and the optical path leading to the relay objective lens 10 after the reflection by the screen member 8 are along a plane perpendicular to the mirror surface and parallel to the slit, and they are proximate to each other at a slight angle. It is therefore necessary to take the following matters into consideration with respect to the arrangement of the field lens 7.

Figure 2:
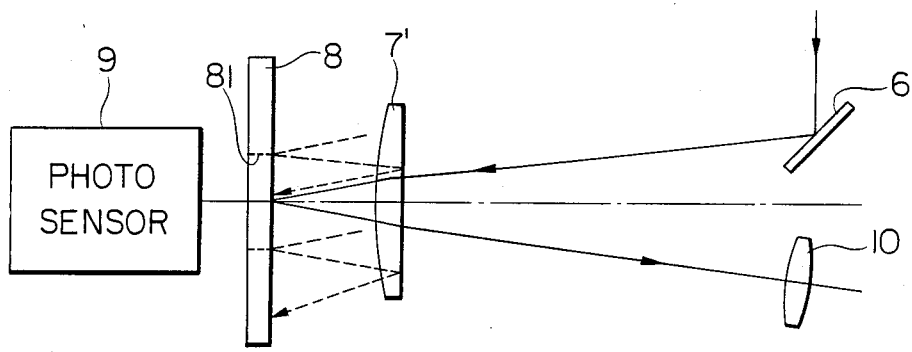
FIG. 2 is an optical path view showing a state in which ghost images are created on a slit by a field lens.

Consider a case where, as shown in FIG. 2, a field lens 7' is disposed so that the optic axis thereof is perpendicular to the mirror surface of the screen member 8. The light beam from the sample 3 is reflected by the reflecting mirror 6, passes through the field lens 7' and is imaged on the screen member 8. At this time, at least two kinds of ghost images which hinder the measurement are created near the slit 81.

Figure 3:
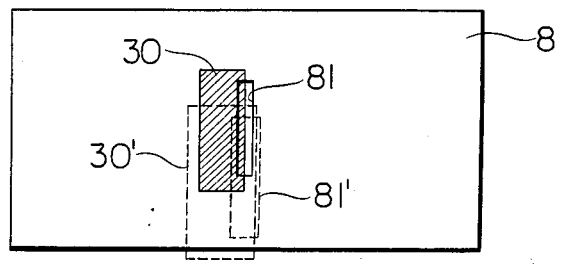
FIG. 3 is a plan view corresponding to FIG. 2 and showing the projected image and ghost images on a screen member.

One of the ghost images is based on the pattern image of the sample 3 projected onto the screen member. The light beam forming the pattern image reflected by the mirror surface of the screen member is reflected by each surface of the field lens 7' and is again projected onto the screen member 8. The pattern image 30 projected onto the vicinity of the slit 81 and the ghost image 30' based thereon are shown in FIG. 3. In the case of a sample having a pattern of high contrast depicted on a glass substrate by evaporating chromium thereon, like a photomask for the manufacture of IC, the ghost image 30' having a clear contrast is observed through the eyepiece 12 and becomes an eyesore. This ghost image 30' is detected by the photoelectric conversion element 9 by the scanning of the image 30 by the slit 81 and may cause an error of measurement.

The other ghost image is the reflected projected image of the slit 81 by the field lens 7'. The screen member is illuminated by the light from the light source 1 through the optical system 2-6 and the field lens 7'. The light applied to the mirror surface of the screen member is reflected therefrom and the light applied to the slit passes therethrough and therefore, the reflected light travelling from the screen member toward the field lens 7' has a contrast corresponding to the shape of the slit. The reflected light having such contrast is again reflected by the surface of the field lens and is projected as the ghost image 81' of FIG. 3 at a position partially overlapping the slit 81 of the screen member.

Figure 4:
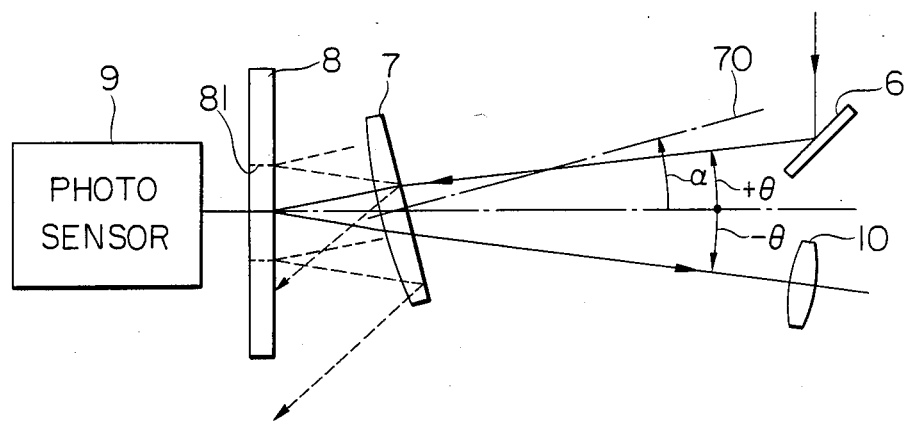
FIG. 4 is an optical path view showing the essential portions of FIG. 1.

Therefore, in the present invention, this field lens is disposed in inclined relationship with respect to the surface of the screen member. More specifically, as shown in FIG. 4, the field lens 7 is disposed with its optic axis being inclined in a y-z plane by an angle $\alpha$ with respect to the normal to the mirror surface of the screen member 8.

Figure 5:
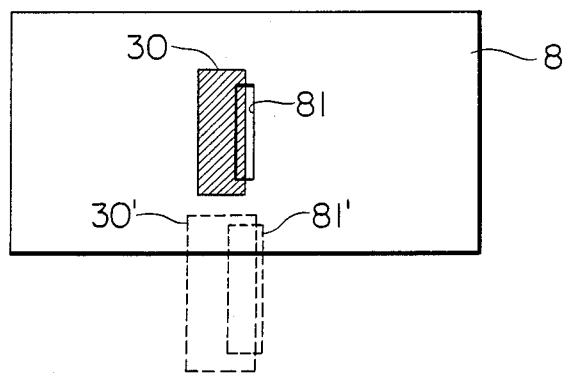
FIG. 5 is a plan view corresponding to FIG. 4 and showing the projected image and ghost images on the screen member.

Thus, the two projected images 30' and 81' are formed at positions on the screen member 8 which are deviated lengthwise of the slit, as shown in FIG. 5. Accordingly, the reflected light from the field lens does not pass through the slit nor appear in the field of view. Moreover, the field lens 7 is inclined toward the lengthwise direction of the slit and the deterioration of the imaging performance on the screen member due to the eccentricity (socalled tilt) of the field lens occurs chiefly in the lengthwise direction of the slit but hardly occurs in the widthwise direction of the slit and therefore, there is no reduction in the measurement accuracy of the slit scan method.

More specifically, it is desirable to dispose the field lens 7 so that the optic axis thereof forms a greater angle with respect to the emergent light travelling from the field lens 7 to the relay objective lens 10 than with respect to the incident light travelling from the reflecting mirror 6 to the field lens 7. That is, as shown in FIG. 4, when the angle of incidence of the principal ray of the imaging light beam entering the field lens 7 is $+\theta$ and the angle of emergence of the principal ray of the observation light beam emerging from the field lens 7 is $-\theta$, it is desirable that the angle $\alpha$ formed by the optic axis 70 of the field lens 7 with respect to the normal to the screen member be $+\theta < \alpha$. In a preferred embodiment, the angle $+\theta$ is set to 4°–5° and the angle $\alpha$ is set to about 10°. To prevent the slit image by the reflection on the field lens from returning into the slit, it is also possible that $\alpha < -\theta$, but in this case, the inclination of the optic axis of the field lens with respect to the incident light beam becomes great and therefore, degradation of the imaging performance of the pattern image becomes significant, and this undesirably leads to the possibility that the measurement accuracy is reduced.

As the angle of inclination of the optic axis of the field lens 7 becomes greater, the positions of the ghost images become more spaced apart from the slit 81, but when the imaging performance of the pattern image is taken into consideration, it is not good to space the ghost images too much apart from the slit. It is preferable that the field lens 7 is inclined until at least the entirety of the reflected projected image 30' by the field lens is formed out of the observation field of the observation optical system 10, 11 and 12.

I claim:
1. An optical apparatus for precisely measuring the dimensions of an object, comprising:
    means for illuminating said object;
    a screen member having a light transparent slit formed therein and having at one side thereof a reflecting surface surrounding said slit, said screen member being movable in a predetermined direction parallel to said reflecting surface, and said slit being elongated perpendicular to said direction;
    a projection optical system having means for forming a projection image of said object on said reflecting surface;
    observation optical means for observing said image; and
    means provided at a side of said screen member opposite to said one side for receiving light passed through said slit;
    said apparatus further comprising field lens means disposed at said one side of said screen member and opposed to said reflecting surface, each of said projection optical system and said observation optical means having an optical path with a portion thereof passing through said field lens means, said optical path portion of said projection optical system being inclined by an angle $\theta$ with respect to a normal to said reflecting surface and said field lens means having an optical axis that is inclined by an angle $\alpha$ with respect to said normal, said angles being formed in the same direction of inclination from said normal in a plane that is perpendicular to said reflecting surface and that is parallel to the length of said slit, and satisfying the relationship $\theta < \alpha$.

2. An optical apparatus according to claim 1, wherein said angle $\theta$ is about 10° and said angle $\alpha$ is about 4° to 5°.

3. An optical apparatus according to claim 1, wherein said observation optical means includes a relay lens having an optical axis coincident with said portion of the optical path of said observation optical means.

4. An optical apparatus according to claim 3, wherein said optical axis of said relay lens is inclined by an angle $-\theta$ with respect to said normal in said plane.

* * * * *